(12) United States Patent
Arai

(10) Patent No.: US 7,667,615 B2
(45) Date of Patent: Feb. 23, 2010

(54) MESSAGE IMAGE DISPLAY DEVICE, MESSAGE IMAGE DISPLAY DEVICE CONTROL METHOD, AND INFORMATION RECORDING MEDIUM

(75) Inventor: Hiroaki Arai, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 338 days.

(21) Appl. No.: 11/885,588

(22) PCT Filed: Feb. 7, 2006

(86) PCT No.: PCT/JP2006/302034

§ 371 (c)(1),
(2), (4) Date: Sep. 4, 2007

(87) PCT Pub. No.: WO2006/092934

PCT Pub. Date: Sep. 8, 2006

(65) Prior Publication Data

US 2008/0211686 A1 Sep. 4, 2008

(30) Foreign Application Priority Data

Mar. 3, 2005 (JP) .............................. 2005-059575

(51) Int. Cl.
*G08B 7/00* (2006.01)
(52) U.S. Cl. ............................... 340/815.69; 340/815.4
(58) Field of Classification Search .............. 340/815.4, 340/815.69
See application file for complete search history.

(56) References Cited

U.S. PATENT DOCUMENTS

| 6,676,519 B2 * | 1/2004 | Nakazawa | 463/31 |
| 2004/0100422 A1 * | 5/2004 | Greenyer | 345/30 |

FOREIGN PATENT DOCUMENTS

| JP | 5-224864 A | 9/1993 |
| JP | 8-202522 A | 8/1996 |
| JP | 2001-358877 A | 12/2001 |
| JP | 2003-952 A | 1/2003 |
| JP | 2003-164669 A | 6/2003 |
| TW | 457510 B | 10/2001 |
| TW | 482990 B | 4/2002 |

* cited by examiner

*Primary Examiner*—Travis R Hunnings
(74) *Attorney, Agent, or Firm*—Sughrue Mion, PLLC

(57) ABSTRACT

To provide a message image display device enabling a user to grasp a content of each message image when a plurality of message images are displayed. A display control unit (76) causes a display unit (82) to display a screen including a plurality of message images. A remaining-time-information storage unit (74) stores remaining time information corresponding to each of the message images. A judging unit (78) judges whether display of at least a part of the message image is limited by one or more other message images. A remaining-time-information updating unit (80) updates the remaining time information according to the judgment result made by the judging unit (78). The display control unit (76) limits display of each of the plurality of message images according to the remaining time information stored corresponding to the message image.

7 Claims, 11 Drawing Sheets

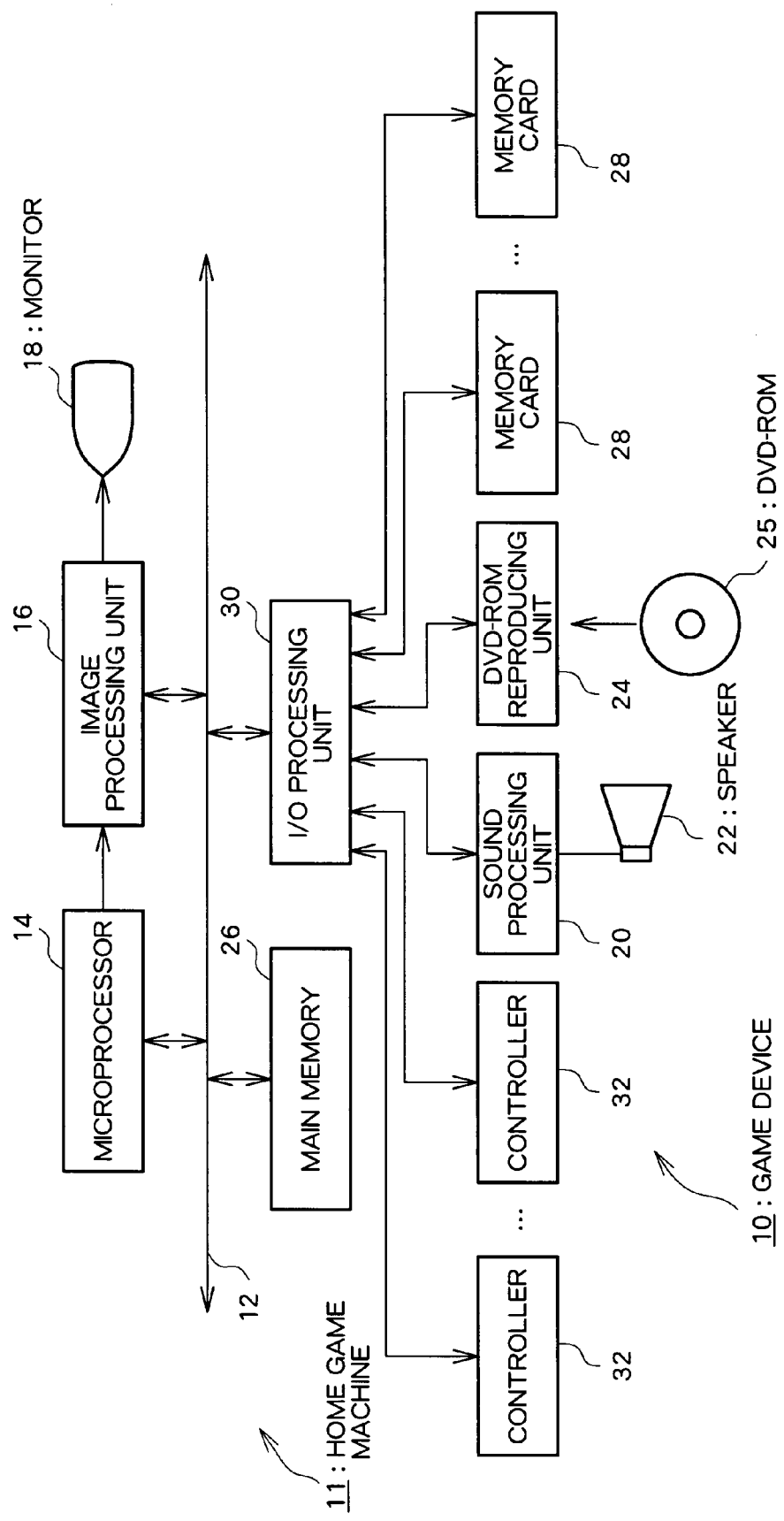

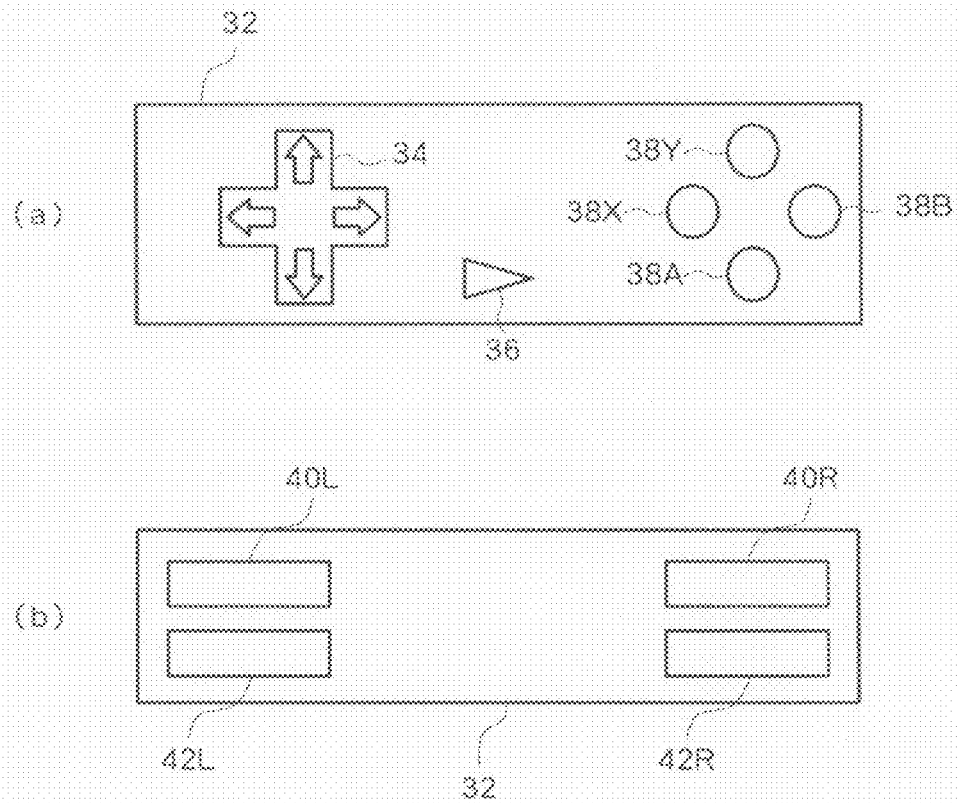
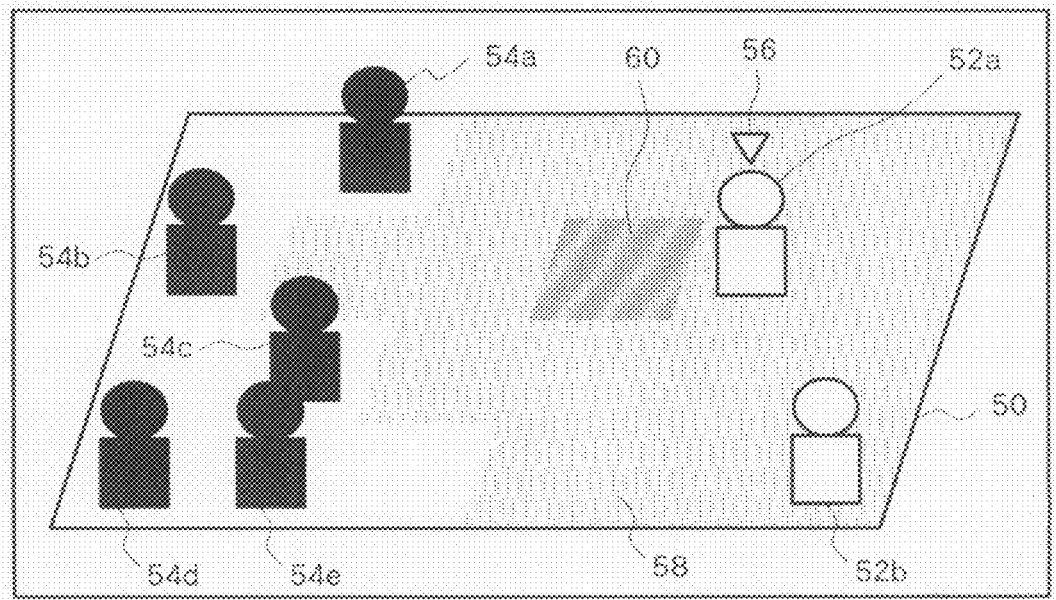

FIG.10

| ID | CURRENT POSITION | HIT POINT | MOVING ABILITY | ATTACKING ABILITY | POSSIBLE ATTACK RANGE | DEFENSIVE ABILITY |
|---|---|---|---|---|---|---|
| P1 | ... | ... | ... | ... | ... | ... |
| P2 | ... | ... | ... | ... | ... | ... |
| E1 | ... | ... | ... | ... | ... | ... |
| E2 | ... | ... | ... | ... | ... | ... |
| E3 | ... | ... | ... | ... | ... | ... |
| E4 | ... | ... | ... | ... | ... | ... |
| E5 | ... | ... | ... | ... | ... | ... |

| ID | MESSAGE CHARACTER STRING | SHAPE |
|---|---|---|
| 1 | I'LL ATTACK YOU | 1 |
| 2 | I'LL COUNTERATTACK AGAINST YOU | 2 |
| 3 | I'LL STAND | 1 |
| 4 | HELP | 3 |

| ID | BALLOON IMAGE TYPE ID | DISPLAY POSITION | REMAINING TIME | DEPTH DEGREE | DEGREE OF IMPORTANCE |
|---|---|---|---|---|---|
| 1 | 2 | X1, Y1 | 300 | D1 | P1 |
| 2 | 4 | X2, Y2 | 300 | D2 | P2 |

MESSAGE IMAGE DISPLAY DEVICE, MESSAGE IMAGE DISPLAY DEVICE CONTROL METHOD, AND INFORMATION RECORDING MEDIUM

TECHNICAL FIELD

The present invention relates to a message image display device, a control method for the message image display device, and an information storage medium.

BACKGROUND ART

There is known a message image display device that displays a plurality of message images. Examples of such a message image display device include a game device that displays a plurality of game characters and displays, in positions corresponding to display positions of the respective characters, with balloon images representing lines of the characters.

[Patent Document 1] JP 2003-952 A

DISCLOSURE OF THE INVENTION

Problems to be Solved by the Invention

In the message image display device described above, because the display of a message image is limited by another message image, a user may be unable to grasp contents of the respective message images.

The present invention has been made in view of the above-mentioned problem and it is an object of the present invention to provide a message image display device, a control method for the message image display device, and an information storage medium that enable to allow a user to grasp, when a plurality of message images are displayed, contents of the respective message images.

Means for Solving the Problems

In order to solve the above-mentioned problem, according to one aspect of the present invention, there is provided a message image display device, including: display control means for causing display means to display a screen including a plurality of message images; remaining-time-information storing means for storing remaining time information corresponding to each of the plurality of message images; judging means for judging whether display of at least a part of the message image is limited by one or more other message images among the plurality of message images; and remaining-time-information updating means for updating the remaining time information according to a result of the judgment by the judging means, in which the display control means limits display of each of the plurality of message images on the basis of the remaining time information stored corresponding to the message image.

According to another aspect of the present invention, there is provided a control method for a message image display device, including: a display control step of causing display means to display a screen including a plurality of message images; a judging step of judging whether display of at least a part of the message image is limited by one or more other message images among the plurality of message images; and a remaining-time-information updating step of updating, according to a result of the judgment by the judging step, remaining time information stored in remaining-time-information storing means for storing the remaining time information corresponding to each of the plurality of message images, in which the display control step includes a step of limiting display of each of the plurality of message images on the basis of the remaining time information stored corresponding to the message image.

According to still another aspect of the present invention, there is provided a program for causing a computer to function as a message image display device, and also to function as: display control means for causing display means to display a screen including a plurality of message images; remaining-time-information storing means for storing remaining time information corresponding to each of the plurality of message images; judging means for judging whether the display of at least a part of the message image is limited by one or more message images among the plurality of message images; and remaining-time-information updating means for updating the remaining time information according to a result of the judgment by the judging means, in which the display control means limiting the display of each of the plurality of message images on the basis of the remaining time information stored corresponding to the message image.

According to yet another aspect of the present invention, there is provided a computer-readable information storage medium storing the above-described program. A program distribution device according to the present invention is a program distribution device which comprises an information storage medium storing the above program, reads out the program from the information recording medium, and distributes the program. A program distribution method of the present invention is a program distribution method including the steps of: reading out a program from an information recording medium storing the above program; and distributing the program.

In the present invention, the screen including the plurality of message images is displayed and the remaining time information is stored corresponding to each of the plurality of message images. It is judged whether the display of at least the part of the message is limited by one or more other message images. The remaining time information is updated according to the result of the judgment. The display of the respective message images is limited on the basis of the remaining time information stored corresponding to the message images. According to the present invention, the remaining time information of the message image is updated according to the result of the judgment on whether the display of at least the part of the message image is limited by the one or more other message images. The display of the message image is limited on the basis of the remaining time information of the message image. As a result, it is possible to allow a user to grasp, when the plurality of message images are displayed, the contents of the respective message images.

In one example of the present invention, the remaining-time-information updating means may update, when it is judged that the display of the message image is not limited by one or more other message images among the plurality of message images, the remaining time information stored corresponding to the message image.

In another example of the present invention, the message image display device may include degree of importance storing means for storing a degree of importance corresponding to each of the plurality of message images, and the display control means may limit, when at least a part of an area on the screen corresponding to a first message image among the plurality of message images and at least a part of an area on the screen corresponding to a second message image being another message image among the plurality of message images overlap each other, display of a portion of the first message image corresponding to at least the part of the area with the second message image, on the basis of a degree of importance stored corresponding to the first message image and a degree of importance stored corresponding to the second message image.

In the above, the display control means may include depth-degree acquiring means for acquiring a depth degree of each of the plurality of message images, and may limit, when at least a part of the area on the screen corresponding to the first message image and at least a part of the area on the screen corresponding to the second message image overlap each other, display of a portion of the first message image corresponding to at least the part of the area with the second message image, on the basis of a corrected depth degree obtained by increasing or decreasing a depth degree of the first message image acquired by the depth degree acquiring means by a degree corresponding to a difference between the degree of importance stored corresponding to the first message image and the degree of importance stored corresponding to the second message image.

BRIEF DESCRIPTION OF THE DRAWINGS

FIG. 1 is a diagram showing a hardware configuration of a game device according to an embodiment of the present invention.

FIG. 2 is diagram showing an example of a controller.

FIG. 3 is a diagram showing an example of a game screen.

FIG. 10 is a diagram showing an example of a unit table.

BEST MODE FOR CARRYING OUT THE INVENTION

Figure 4:
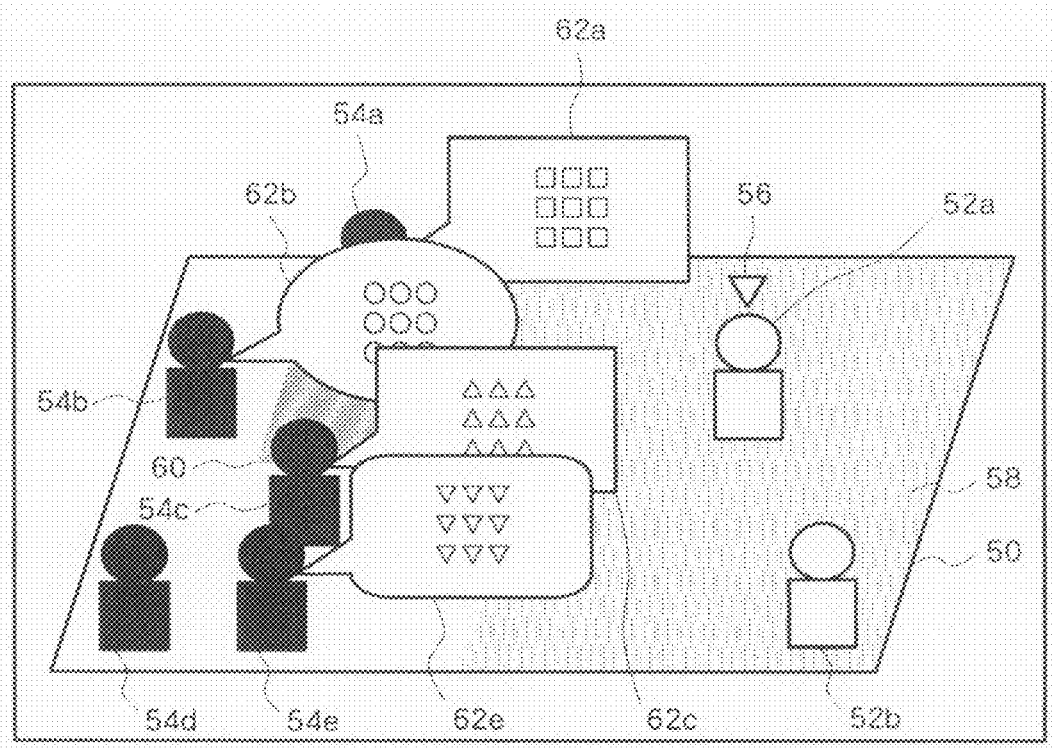
FIG. 4 is a diagram showing an example of a game screen.

An example of an embodiment of the present invention will be hereinafter explained in detail referring to the drawings. Here, an example will be explained in a case in which the present invention is applied to a game device, which is a mode of a message image display device.

FIG. 1 is a diagram illustrating a hardware configuration of a game device according to the embodiment of the present invention. A game device 10 illustrated in FIG. 1 has a configuration in which a DVD-ROM 25 being an information storage medium and memory cards 28 are inserted into a home game machine 11, and a monitor 18 and a speaker 22 are connected to the home game machine 11. For example, a domestic TV receiving set is used for the monitor 18, and a built-in speaker thereof is used for the speaker 22.

The home game machine 11 is a well-known computer game system comprising a bus 12, a microprocessor 14, an image processing unit 16, a sound processing unit 20, a DVD-ROM reproducing unit 24, a main memory 26, an input/output (I/O) processing unit 30, and controllers 32. An enclosure accommodates the components other than the controllers 32.

The bus 12 is used for exchanging addresses and/or data among the respective units of the home game machine 11. The microprocessor 14, the image processing unit 16, the main memory 26, and the I/O processing unit 30 are connected to each other via the bus 12 so as to be communicable with each other.

The microprocessor 14 controls the individual units of the home game machine 11 on the basis of an operating system (OS) stored in a ROM (not shown), a program read from the DVD-ROM 25, and the data read from the memory cards 28. The main memory 26 comprises, for example, a RAM, and the program read from the DVD-ROM 25 and the data read from the memory cards 28 are written in the main memory 26 if necessary. The main memory 26 is also used employed as a working memory for the microprocessor 14.

The image processing unit 16 comprises a VRAM and renders, based on the image data sent from the microprocessor 14, a game screen in the VRAM. Then, the image processing unit 16 converts a content thereof into video signals and outputs the video signals to the monitor 18 at predetermined timings.

The I/O processing unit 30 is an interface used for the microprocessor 14 to access the sound processing unit 20, the DVD-ROM reproducing unit 24, the memory cards 28, and the controllers 32. The sound processing unit 20, the DVD-ROM reproducing unit 24, the memory cards 28, and the controllers 32 are connected to the I/O processing unit 30.

The sound processing unit 20, comprising a sound buffer, reproduces and outputs, via the speaker 22, various sound data such as game music, game sound effects, and messages, and so forth, read from the DVD-ROM 25 and stored in the sound buffer.

The DVD-ROM reproducing unit 24 reads a program from the DVD-ROM 25 in accordance with an instruction given from the microprocessor 14. It should be noted that the DVD-ROM 25 is used for supplying the program to the home game machine 11. However, any other various information storage media such as CD-ROMs and ROM cards, or the like, may also be used. Further, the program may also be supplied to the home game machine 11 from a far-off area via a data communication network such as the Internet, or the like.

Each of the memory cards 28 comprises a nonvolatile memory (for example, an EEPROM, or the like). The home game machine 11 has a plurality of memory card slots into which the memory cards 28 are inserted, and the plurality of memory cards 28 can be simultaneously inserted. Each of the memory cards 28 is constructed so as to be capable of being inserted into and removed from the memory card slot, and is used for storing various game data such as save data, or the like.

The controller 32 is a general-purpose operation input means used by a player to input various game operations. The I/O processing unit 30 scans statuses of the respective portions of the controller 32 at an interval of a fixed period (e.g., every 1/60 sec), and transfers operation signals representing scanned results to the microprocessor 14 via the bus 12. The microprocessor 14 determines, based on this operation signal, the game operation by the player. The home game machine 11 is configured to be connectable with the plurality of controllers 32, and the microprocessor 14 performs the game control on the basis of the operation signals inputted from the respective controllers 32.

FIG. 2 are diagrams illustrating an example of the controller 32. The controller 32 illustrated in the figures is a general-purpose game controller. As shown in FIG. 2(a), the surface of the controller 32 is provided with a direction button 34, a start button 36, and buttons 38X, 38Y, 38A, and 38B. Further, as illustrated in FIG. 2(b), the buttons 42L, 42R, formed on the top surface on the left and right sides thereof closer to the front surface, and the buttons 40L, 40R, similarly formed but closer to the rear surface. The direction button 34 has a cross-shape and is normally used for designating a moving direction of a character or a cursor. The start button 36 is a small-sized push button having a triangular shape and is normally used for starting or forcibly ending the game. The buttons 38X, 38Y, 38A, 38B, 40L, 40R, 42L, and 42R are used for other game operations.

The game device 10 having the hardware configuration described above provides a simulation game, in which, through execution of the game program read from the DVD-ROM 25 by the microprocessor 14, the player gives instructions related to a move, an attack, or the like, to operation object units belonging to a player team (which will hereinafter be referred to as player units) to aim at zeroing a hit point of units belonging to an enemy team operated by a computer (which will hereinafter be referred to as enemy units).

This simulation game proceeds alternately by a turn in which the player gives instructions to player units (which will hereinafter be referred to as player's turn) and a turn in which the computer gives instructions to the enemy unit (which will hereinafter be referred to as enemy's turn).

In the player's turn, action instructions such as "move", "attack", or the like, are given to the player unit. To be specific, the player unit to which the action instruction is to be given (action instruction object player unit) is first selected. Then, the moving instruction is given to the player unit so as to move to a position at which an attack can be made on the enemy unit. Further, an instruction is given to the player unit, which has moved to the position at which the attack can be made on the enemy unit, so as to attack the enemy unit.

FIGS. 3 to 6 each illustrate an example of the game screen in the case of giving the moving instruction to the player unit in the player's turn. More specifically, FIGS. 3 to 6 each show an example of the game screen in the case of determining a moving destination of the player unit.

As illustrated in FIG. 3, a game field image 50 is displayed on the game screen. Further, player unit images 52a and 52b and enemy unit images 54a, 54b, 54c, 54d, and 54e are displayed on the game screen. Still further, a marker image 56 is displayed above the player unit image 52a on the game screen illustrated in FIG. 3. The marker image 56 indicates the instruction object player unit image. Specifically, on the game screen shown in FIG. 3, the player unit image 52a is defined as a moving instruction object. In other words, the game screen illustrated in FIG. 3 is a screen for determining the moving destination of the player unit image 52a. Further, a movable range guide image 58 is displayed on the game screen. The movable range guide image 58 is displayed over the game field image 50, and serves to indicate the movable range of the player unit image 52a which is the moving instruction object. Yet further, a cursor image 60 is displayed on the game screen. The cursor image 60 moves across the game field image 50 in accordance with the operation of the direction button 34. On the game screen in a state shown in FIG. 3, the player moves the cursor image 60 to a moving destination position candidate of the player unit image 52a by operating the direction button 34.

When the player moves the cursor image 60, for example, a game screen shown in FIG. 4 is displayed. On the game screen shown in the figure, balloon images 62a, 62b, 62c, and 62e are displayed. The balloon image 62a is a balloon image corresponding to the enemy unit image 54a. Similarly, the balloon images 62b, 62c, and 62e are balloon images corresponding to the enemy unit images 54b, 54c, and 54e, respectively. In the example in the figure, no balloon image corresponds to the enemy unit image 54d.

The balloon image is displayed so as to correspond to (1) the enemy unit that cannot be attacked by the moving instruction object player unit from the moving destination position candidate but is capable of attacking an object at the moving destination position candidate (more precisely, the player unit located at the moving destination position candidate) in the next enemy's turn, or (2) the enemy unit that can be attacked by the moving instruction object player unit from the moving destination position candidate.

For instance, the balloon image corresponding to the former enemy unit has a line such as "I'll attack you" etc. displayed in the balloon.

Further, for example, in the balloon image corresponding to "the enemy unit whose hit point is presumed not to become zero even when attacked by the moving instruction object player unit and which is capable of attacking an object at the moving destination position candidate (more accurately, the player unit located at the moving destination position candidate) in the next enemy's turn" among the latter enemy units, a line expressing an aggressive feeling such as "I'll counter-attack against you" etc. is displayed in the balloon. In this case, a balloon shape of the balloon image is formed in a shape that expresses the aggressive feeling.

Further, for instance, the balloon image corresponding to "the enemy unit whose hit point is presumed not to become zero even when attacked by the moving instruction object player unit and which is incapable of attacking an object at the moving destination position candidate in the next enemy's turn" among the latter enemy units, has a line such as "I'll stand" etc. displayed in the balloon.

Further, for example, the balloon image corresponding to "the enemy unit whose hit point is presumed to become zero when attacked by the moving instruction object player unit" among the latter enemy units, has a line expressing a weak-spirited feeling such as "Help" etc. displayed in the balloon. In this case, the balloon shape of the balloon image is formed in a shape expressing the weak-spirited feeling.

According to the display of this balloon image, the player can grasp at a glance from contents and shapes of the balloon images, when the player moves the moving instruction object player unit (the player unit image 52a) to a moving destination position candidate, "to which enemy unit an attack can be performed", "whether it is possible to decrease a hit point of the enemy unit to zero with the attack", "which enemy unit is likely to attack in the next enemy's turn", and the like. In other words, the player can relatively easily acquire information necessary for determining a moving destination position of the player unit.

Figure 5:
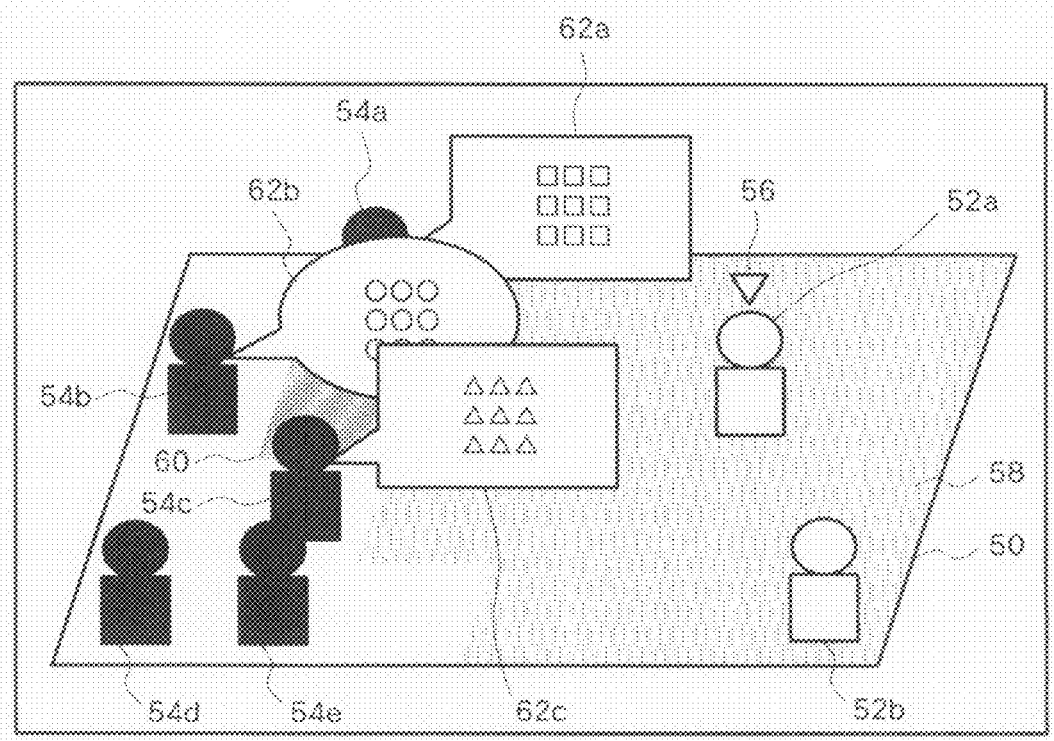
FIG. 5 is a diagram showing an example of a game screen.

In a game screen shown in FIG. 4, the balloon images 62a, 62b, and 62c are displayed so as to overlap one another, so content thereof is difficult to be viewed. In this regard, in the game device 10, when a predetermined time elapses while the state shown in the figure is kept, i.e., while the position of the cursor image 60 is not updated by direction instruction operation, as shown in FIG. 5, the balloon image 62e on which another balloon image is not superimposed disappears. After that, when the predetermined time further elapses while the state shown in FIG. 5 is kept, the balloon image 62c on which another balloon image is not superimposed disappears. Similarly, when the predetermined time further elapses while the state is maintained, the balloon image 62b on which another balloon image is not superimposed disappears. In this way, in the game device 10, since the balloon images disappear in order from the one displayed in the front of the game screen, the player can grasp contents of the respective balloon images.

Figure 6:
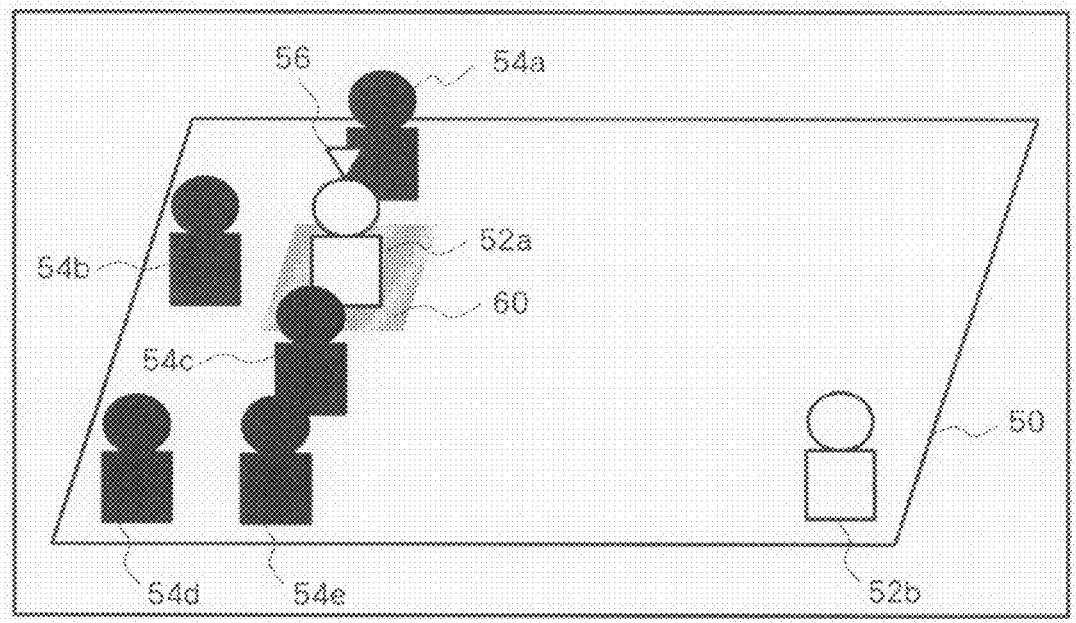
FIG. 6 is a diagram showing an example of a game screen.

In the game screen shown in FIG. 4 or FIG. 5, when a predetermined determination operation (e.g., depression operation of the button 38A) is performed, a moving destination position candidate at that point (i.e., a position pointed by the cursor image 60 at that point) is determined as a moving destination position. Then, for example, a game screen shown in FIG. 6 is displayed.

Figure 7:
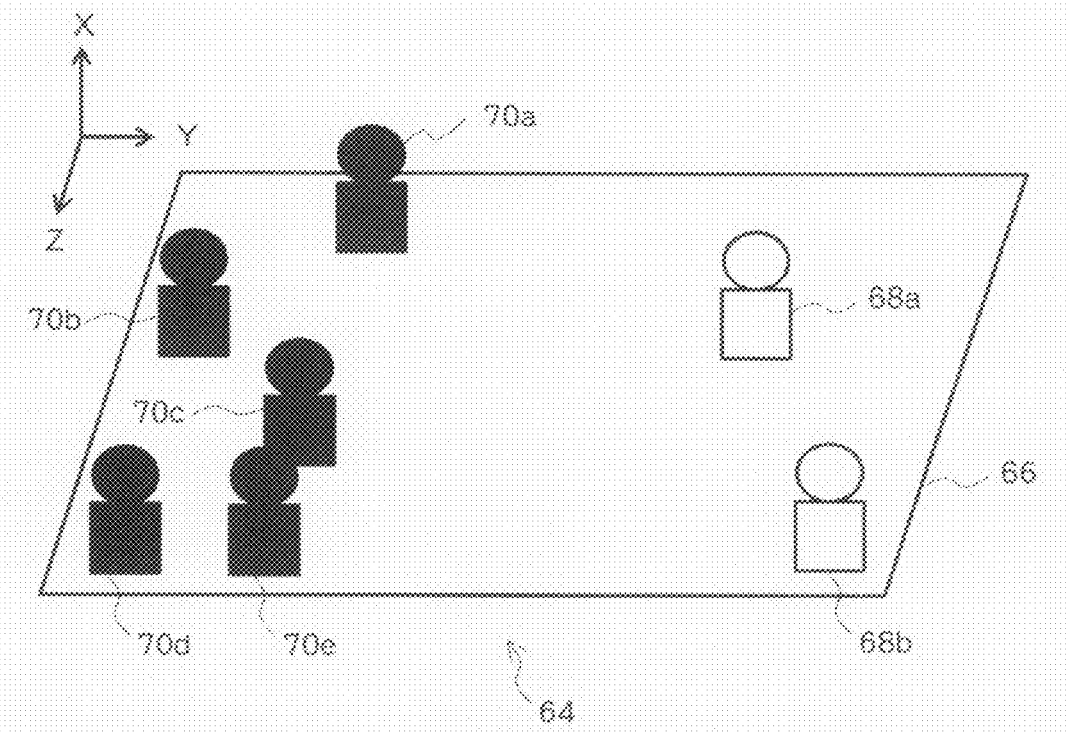
FIG. 7 is a perspective view showing an example of a virtual three-dimensional space.
Figure 8:
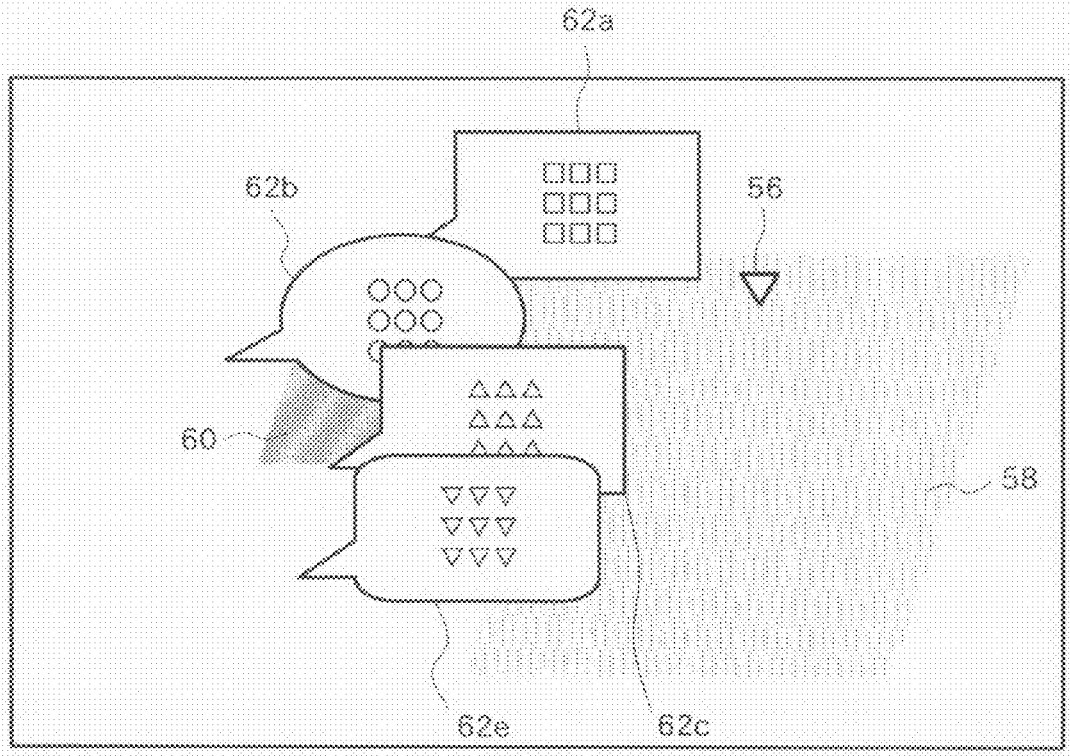
FIG. 8 is a diagram showing an example of an image for synthesis.

Note that a virtual three-dimensional space as illustrated in FIG. 7 is constructed in the main memory 26 in order to create the game screen described above. As illustrated in FIG. 7, a game field object 66 is arranged in the virtual three-dimensional space 64. Further, player unit objects 68a and 68b and enemy unit objects 70a, 70b, 70c, 70d, and 70e are arranged on the game field object 66. The game device 10 creates a field-of-view image obtained by viewing the virtual three-dimensional space 64 from a given viewpoint in a given sight line direction. Further, the game device 10 creates a full-transparency image for synthesis, which has the same size as the field-of-view image. The image for synthesis is attached with the marker image 56, the movable range guide image 58, the cursor image 60, and the balloon image 62a. The image for synthesis is eventually organized into an image as illustrated in FIG. 8. Then, an image obtained by synthesizing the field-of-view image and the image for synthesis is created in the VRAM of the game device 10. The image created in the VRAM is displayed as the game screen on the monitor 18 at a predetermined timing.

Figure 9:
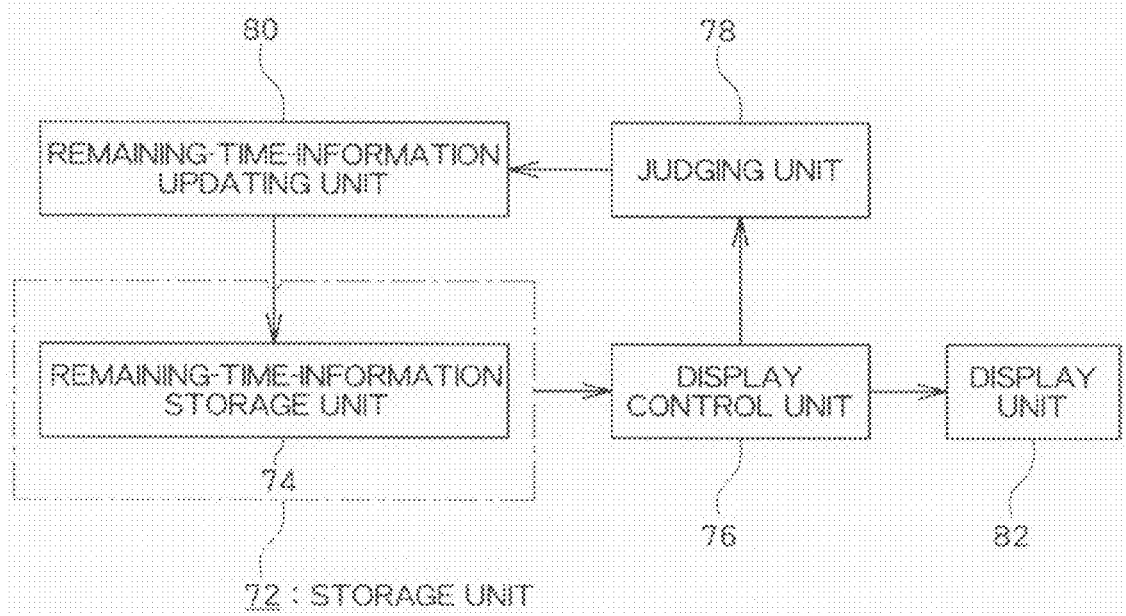
FIG. 9 is a diagram showing functional blocks of the game device according to the embodiment.

Given herein is a description of a functional configuration of the game device 10. FIG. 9 mainly shows functional blocks related to the present invention in the functional blocks realized in the game device 10. As shown in FIG. 9, the game device 10 includes a storage unit 72, a display control unit 76, a judging unit 78, a remaining-time-information updating unit 80, and a display unit 82. Those functions are realized by the microprocessor 14 executing the program supplied via the DVD-ROM 25.

[1. Storage Unit]

The storage unit 72 is mainly realized by the DVD-ROM 25 and the main memory 26.

The storage unit 72 stores data concerning the player units and the enemy units. For example, parameter information, object data, and the like of the respective units are stored in the storage unit 72. In this embodiment, for example, a unit table shown in FIG. 10 is stored in the storage unit 72. The unit table shown in the figure includes an ID field, a current position field, a hit point field, a moving ability field, an attacking ability field, a possible attack range field, and a defensive ability field. In the ID field, identification information (ID) for uniquely identifying the respective units is stored. In the figure, a first character of the ID acts as information indicating whether a unit identified by the ID is a player unit (P) or an enemy unit (E).

The current position field stores information (parameter) specifying the current position of the unit. The current position field may also store information specifying a position of the unit on the game screen (i.e., unit image display position) or may further store information specifying a position of the unit in the virtual three-dimensional space 64 (i.e., unit object position). This embodiment will give an exemplification on the assumption that the information specifying the position of the unit in the virtual three-dimensional space 64 is stored in the current position field.

The hit point field stores a hit point of the unit. The hit point is a parameter indicating a physical strength and a vital force of the unit. When the hit point comes to 0, the action instruction for the unit is restricted.

The moving ability field stores a moving ability parameter. The moving ability parameter is defined as numerical information representing a movable distance of the unit in one turn (corresponding to one moving instruction).

The attacking ability field stores an attacking ability parameter. The attacking ability parameter is defined as numerical information representing an attacking ability of the unit. For instance, if the player unit attacks the enemy unit, a magnitude of the damage (hit point reduction quantity) to the enemy unit is determined based on the attacking ability parameter of the player unit.

The possible attack range field stores a possible attack range parameter. The possible attack range parameter is defined as numerical information representing a possible attack range of the unit. In other words, each player unit can attack the enemy units located within the range determined based on the possible attack range parameter from the current position, while each enemy unit can attack the player units located within the range determined based on the possible attack range parameter from the current position. Note that the possible attack range parameter may also be a parameter indicating a distance on the game screen or may be a parameter indicating a distance in the virtual three-dimensional space 64. This embodiment will give an exemplification on the assumption that the possible attack range parameter indicates the distance in the virtual three-dimensional space 64.

The defensive ability field stores a defensive ability parameter. The defensive ability parameter is defined as numerical information representing a defensive ability of the unit. For example, if the player unit attacks the enemy unit, a magnitude of the damage (hit point reduction quantity) to the enemy unit is determined based on the defensive ability parameter of the enemy unit. Further, if the player unit is attacked by the enemy unit, a magnitude of the damage (hit point reduction quantity) to the player unit is determined based on the defensive ability parameter of the player unit.

Figures 11, 12, 13:
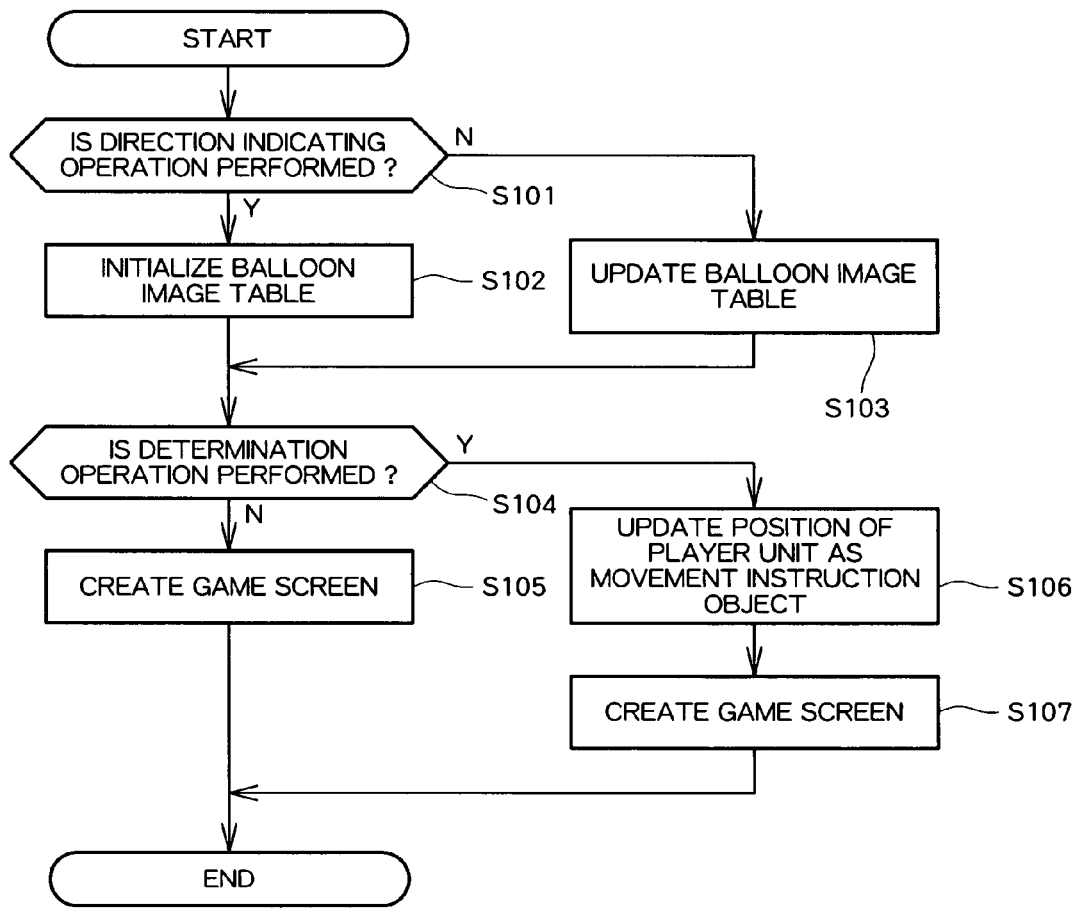
FIG. 11 is a diagram showing an example of a balloon image type table.
FIG. 12 is a diagram showing an example of a balloon image table.
FIG. 13 is a flowchart showing processing executed in the game device.

In this embodiment, for example, a balloon image type table shown in FIG. 11 is stored in the storage unit 72. The balloon image type table shown in the figure includes an ID field, a message character string field, and a shape field. In the ID field, identification information (ID) for uniquely identifying a balloon image type is stored. In the message character string field, a message character string displayed in a balloon is stored. In the shape field, information for specifying a shape of the balloon is stored. In the example in the figure, a shape "1" indicates, for example, a balloon shape related to the balloon image 62e of FIG. 4. A shape "2" indicates, for example, a balloon shape related to the balloon images 62a and 62c of FIG. 4. A shape "3" indicates, for example, a balloon shape related to the balloon image 62b of FIG. 4.

[2. Remaining-Time-Information Storage Unit]

The storage unit 72 includes a remaining-time-information storage unit 74. The remaining-time-information storage unit 74 stores remaining time information corresponding to each of a plurality of balloon images (message images) displayed on a game screen. The remaining time information is information directly or indirectly indicating a remaining time until the display of the balloon images is limited. For example, the remaining time information may be a combination of information indicating a maximum time until the display of the balloon images is limited and information indicating time elapsed from the display of the balloon images.

In this embodiment, for example, a balloon image table shown in FIG. 12 is stored in the remaining-time-information storage unit 74 (degree of importance storing means). The balloon image table shown in the figure includes an ID field, a balloon image type ID field, a display position field, a remaining time field, a depth degree field, and a degree of importance field. In the ID field, information (ID) for uniquely identifying a balloon image displayed on a game screen is stored. In the balloon image type ID field, any one of IDs stored in the ID field of the balloon image type table is stored. In other words, a balloon shape of the balloon image and a message character string displayed in the balloon are specified by this balloon image type ID field. In the display position field, a display position on the game screen of the balloon image is stored. More specifically, a position on the game screen of a representative point of the balloon image is stored. In the remaining time field, information indicating a remaining time until the display of the balloon image is limited. In this embodiment, numerical information indicating the remaining time in units of 1/60 second is stored.

In the depth degree field, a depth degree of the balloon image is stored. In this embodiment, depth degrees of the respective balloon images are indicated by numerical values. As described later, in this embodiment, when at least a part of an area on the game screen corresponding to a certain balloon image and at least a part of an area on the game screen corresponding to another balloon image overlap each other, a balloon image with a smaller depth degree is displayed in the front. In other words, the display of at least a part of a balloon image with a larger depth degree is limited by the other balloon image.

In the degree of importance field, information indicating a degree of importance of the balloon image is stored. In this embodiment, degrees of importance of the respective balloon images are indicated by numerical values. Concerning a balloon image with a high degree of importance, a numerical value stored in the degree of importance field is large. For example, a degree of importance of a balloon image may be determined on the basis of an enemy unit to which the balloon image corresponds or may be determined on the basis of a balloon image type of the balloon image. In the former case, for example, a degree of importance of a balloon image corresponding to an important enemy unit may be set high. In the latter case, a degree of importance of a balloon image including an important message image may be set high.

[3. Display Control Unit and Display Unit]

The display control unit 76 is realized mainly with the image processing unit 16. The display unit 82 is realized mainly with the monitor 18. The display control unit 76 causes the game screen containing a plurality of balloon images to be displayed on the display unit 82.

In addition, when at least a part of an area on the screen corresponding to a balloon image (a first balloon image) and at least a part of areas on the screen corresponding to another balloon image (a second balloon image) overlap each other, the display control unit 76 may limit the display of a part of the first balloon image corresponding to the overlapping area on the basis of a degree of importance stored corresponding to the first balloon image and a degree of importance stored corresponding to the second balloon image. In this case, the display control unit 76 may limit the display of the part of the first balloon image corresponding to the overlapping area on the basis of a corrected depth degree obtained by increasing or decreasing a depth degree of the first balloon image by a degree corresponding to a difference between the degree of importance stored corresponding to the first balloon image and the degree of importance stored corresponding to the second balloon image.

An area on the screen corresponding to a balloon image is, for example, an area on the game screen occupied when the entire balloon image is displayed on the game screen.

Further, the display control unit 76 limits the display of each balloon image on the basis of remaining time information stored corresponding to the balloon image. For example, when it is judged that remaining time information stored corresponding to a balloon image satisfies a predetermined condition, the display control unit 76 limits the display of the balloon image. As a form of limiting the display of the balloon image, for example, the display of the balloon image on the game screen is inhibited, transparency (translucency) of the balloon image is increased, a depth degree of the balloon image is increased, or the like. In this embodiment, when it is judged that a value of the remaining time field corresponding to a certain balloon image decreases to 0, the balloon image is not displayed on the game screen.

[4. Judging Unit]

The judging unit 78 judges, for each balloon image to be displayed on the game screen, whether the display of the balloon image is limited by another balloon image. For example, the judging unit 78 judges whether an area on the game screen corresponding to a balloon image and an area on the game screen corresponding to another balloon image overlap each other. Then, the judging unit 78 judges whether the other balloon image is displayed in the overlapping area. In other words, the judging unit 78 judges whether the other balloon image is displayed on at least a part of the balloon image.

[5. Remaining-Time-Information Updating Unit]

The remaining-time-information updating unit 80 updates remaining time information stored in the remaining-time-information storage unit 74 according to a result of the judgment by the judging unit 78. For example, when it is judged that the display of a certain balloon image is not limited by another balloon image, the remaining-time-information updating unit 80 updates remaining time information stored corresponding to the balloon image such that a remaining time indicated by the remaining time information decreases. Alternatively, when it is judged that the display of a certain balloon image is limited by another balloon image, the remaining-time-information updating unit 80 may update remaining time information stored corresponding to the balloon image such that a remaining time indicated by the remaining time information increases. In this embodiment, a value of the remaining time filed of the balloon image table is decreased according to a result of the judgment by the judging unit 78.

Processing executed every predetermined time (e.g., 1/60 second) in the game device 10 will be explained. Here, processing executed, in particular, after a movement instruction object player unit is selected, until a moving destination position of the movement instruction object player unit is determined, will be explained. In other words, processing executed in order to display the game screens shown in FIGS. 3 to 6 will be explained. FIG. 13 is a flowchart showing the processing.

As shown in FIG. 13, in the game device 10, first, it is judged whether a direction indicating operation has been performed (S101). In other words, it is judged whether an operation for updating a position of the cursor image 60 has been performed. This judgment is performed on the basis of an operation signal inputted from the controller 32. For example, it is judged whether an operation signal indicating depression operation of the direction button 34 is inputted from the controller 32.

Figure 14:
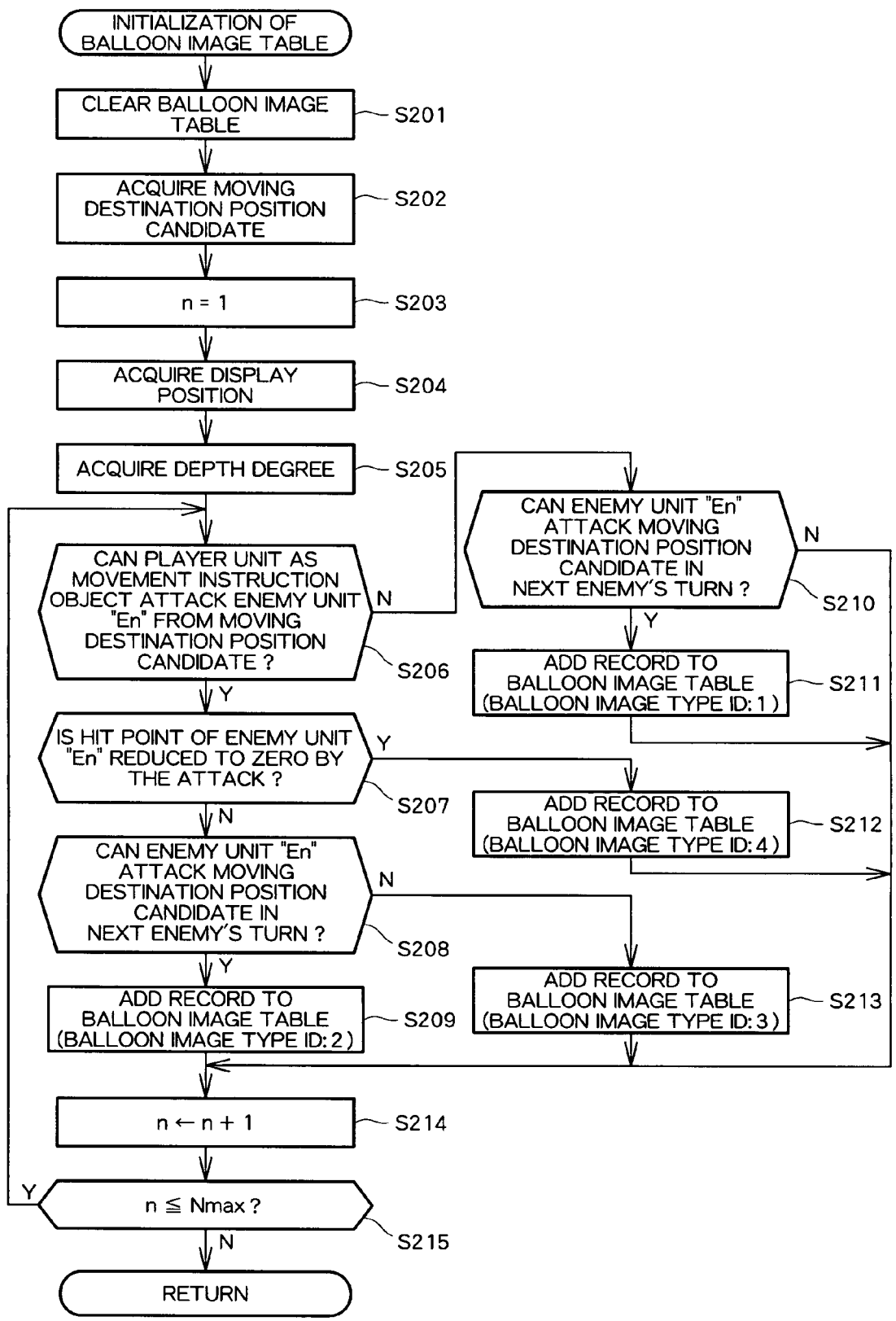
FIG. 14 is a flowchart showing processing executed in the game device.

When it is judged that the direction indicating operation has been performed, the display control unit 76 executes processing for initializing the balloon image table (S102). FIG. 14 is a flowchart showing the processing for initializing the balloon image table.

As shown in FIG. 14, in this processing, first, contents of the balloon image table are cleared (S201). Specifically, all records (data) of the balloon image table are deleted. Subsequently, the display control unit 76 acquires a moving destination position candidate (S202). The display control unit 76 holds information for specifying a present moving destination position candidate (hereinafter, referred to as moving destination position candidate information). The display control unit 76 acquires content of the direction indicating operation on the basis of an operation signal inputted from the controller 32 and sets a position obtained by moving the present moving destination position candidate by a predetermined distance in a direction corresponding to the content of the direction indicating operation as a new moving destination position candidate. The display control unit 76 updates the moving destination position candidate information.

Subsequently, the display control unit 76 initializes a variable n to 1 (S203). The display control unit 76 executes processing in S204 to S213 with an enemy unit having an ID "En" (hereinafter, referred to as an enemy unit "En") as an object.

The display control unit 76 acquires a display position of an enemy unit image corresponding to the enemy unit "En" (hereinafter, referred to as enemy unit image "En") (S204). Specifically, the display control unit 76 reads out a position in a virtual three-dimensional space 64 of an enemy unit object corresponding to the enemy unit "En" (hereinafter, referred to as enemy unit object "En") from the current position field of the unit table and acquires a position on the game screen corresponding to the position as a display position of the enemy unit image "En".

The display control unit 76 (depth-degree acquiring means) acquires a depth degree corresponding to the enemy unit image "En" (S205). The depth degree corresponding to the enemy unit image "En" is calculated on the basis of a distance from a viewpoint position in the virtual three-dimensional space 64 to the position of the enemy unit object "En". In this embodiment, the depth degree corresponding to the enemy unit image "En" increases as the distance from the viewpoint position to the position of the enemy unit object "En" increases. As described later, the depth degree acquired in this step is stored in the depth degree field of the balloon image table as a depth degree of a balloon image corresponding to the enemy unit "En".

After that, the display control unit 76 judges whether the movement instruction object player unit can attack the enemy unit "En" from the moving destination position candidate (S206). The display control unit 76 reads out a possible attack range parameter of the movement instruction object player unit. The display control unit 76 acquires, on the basis of this possible attack range parameter and the moving destination position candidate information, a range in which the movement instruction object player unit can attack from the moving destination position candidate. The display control unit 76 reads out a current position of the enemy unit "En" and judges whether the current position is included in the possible attack range. When it is judged that the current position of the enemy unit "En" is included in the possible attack range, the display control unit 76 judges that the movement instruction object player unit can attack the enemy unit "En" from the moving destination position candidate.

When it is judged that the movement instruction object player unit cannot attack the enemy unit "En" from the moving destination position candidate, the display control unit 76 judges whether the enemy unit "En" can attack the moving destination position candidate (more precisely, a player unit located in the moving destination position candidate) in the next enemy's turn (S210). The display control unit 76 reads out a moving ability parameter and a possible attack range parameter of the enemy unit "En" from the unit table. The display control unit 76 judges, on the basis of these parameters, whether the enemy unit "En" can move, in the next enemy's turn, to a position where the enemy unit "En" can attack the moving destination position candidate. When it is judged that the enemy unit "En" can perform such movement, the display control unit 76 judges that the enemy unit "En" can attack the moving destination position candidate in the next enemy's turn.

When it is judged that the enemy unit "En" can attack the moving destination position candidate in the next enemy's turn, the display control unit 76 adds a record to the balloon image table (S211). In this case, 1 is stored in the balloon image type ID field of a newly added record. In the ID field, a value obtained by adding 1 to the number of record stored in the balloon image table is stored. For example, when no record is stored in the balloon image table, 1 is stored in the ID field. In the display position field, information indicating a display position determined on the basis of the display position of the enemy unit image "En" acquired in S204 is stored. In the remaining time field, a predetermined initial value (e.g., 300) is stored. In the depth degree field, the depth degree acquired in S205 is stored. In the degree of importance field, information indicating a predetermined degree of importance corresponding to the enemy unit "En" or the balloon image type ID "1" is stored.

On the other hand, when it is judged in S206 that the movement instruction object player unit can attack the enemy unit "En" from the moving destination position candidate, the display control unit 76 judges whether a hit point of the enemy unit "En" is reduced to zero by the attack (S207). The display control unit 76 reads out a defensive ability parameter and a hit point (a hit point residual amount) of the enemy unit "En". The display control unit 76 reads out an attacking ability parameter of the movement instruction object player unit. The display control unit 76 calculates a damage amount (a hit point decrease amount) due to the attack by comparing the defensive ability parameter of the enemy unit "En" and the attacking ability parameter of the movement instruction object player unit. The display control unit 76 judges whether the hit point decrease amount is equal to or larger than the hit point residual amount of the enemy unit "En".

When it is judged that the hit point of the enemy unit "En" decreases to zero, the display control unit 76 adds a record to the balloon image table (S212). In this case, 4 is stored in the balloon image type ID field of the newly added record. In the other fields, various kinds of information are stored as in the processing in S211.

On the other hand, when it is judged that the hit point of the enemy unit "En" does not decrease to zero (S207), the display control unit 76 judges whether the enemy unit "En" can attack the moving destination position candidate (more specifically, the player unit located in the moving destination position candidate) in the next enemy's turn (S208). This processing is performed in the same manner as the processing in S210.

When it is judged that the enemy unit "En" can attack the moving destination position candidate in the next enemy's turn, the display control unit 76 adds a record in the balloon image table (S209). In this case, 2 is stored in the balloon image type ID field of the newly added record. In the other fields, various kinds of information are stored, as in the processing in S211.

On the other hand, when it is judged that the enemy unit "En" cannot attack the moving destination position candidate in the next enemy's turn, the display control unit 76 adds a record to the balloon image table (S213). In this case, 3 is stored in the balloon image type ID field of the newly added record. In the other fields, various kinds of information are stored as in the processing in S211.

After executing the processing in S204 to S213 on the enemy unit "En", the display control unit 76 increments the variable n (S214). The display control unit 76 judges whether the variable n is equal to or smaller than Nmax (S215). Nmax is a predetermined constant indicating a total number of enemy units. In this embodiment, Nmax is 5. When it is judge that the variable n is equal to or smaller than Nmax, the display control unit 76 executes the processing in S204 to S213 on the enemy unit "En". On the other hand, when it is judged that the variable n is larger than Nmax, the processing for initializing the balloon image table is finished.

Figure 15:
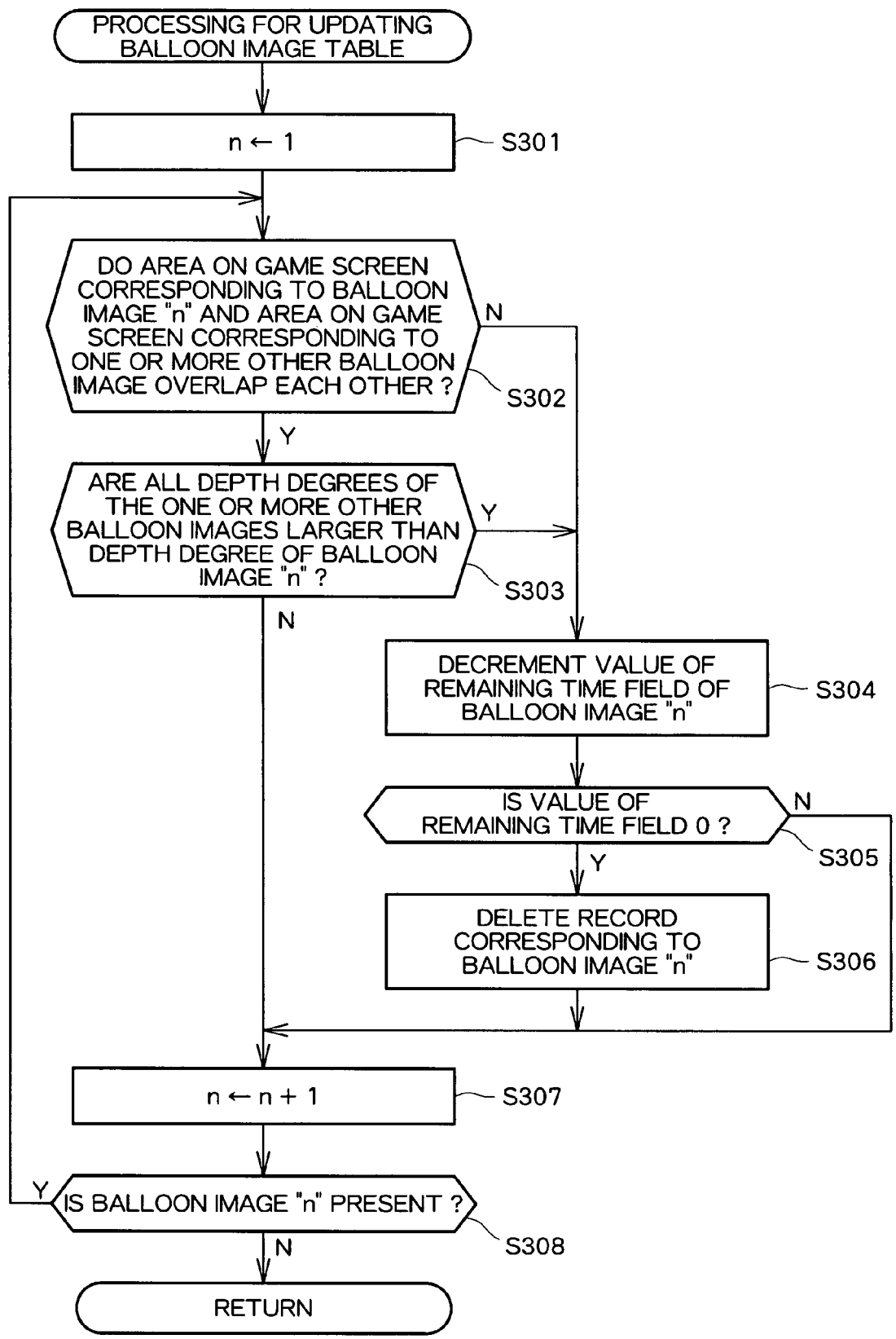
FIG. 15 is a flowchart showing processing executed in the game device.

When it is judged in S101 that the direction indicating operation has not been performed, the display control unit 76 updates the balloon image table (S103). FIG. 15 is a flowchart showing processing for updating the balloon image table.

As shown in FIG. 15, in this processing, first, the variable n is initialized to 1 (S301). Processing in S302 to S306 is executed with a balloon image with an ID "n" (hereinafter, referred to as balloon image "n") as an object.

In other words, it is judged whether at least a part of an area on the game screen corresponding to the balloon image "n" and at least a part of an area on the game screen corresponding to one or more other balloon images overlap each other (S302). Here, the area on the game screen corresponding to the balloon image "n" is an area on the game screen occupied when the entire balloon image "n" is displayed on the game screen. The balloon image "n" is an image in which a message character string specified by the balloon image type ID field of the balloon image table (the message character string field of the balloon image type table) is included in a balloon of a shape specified by the field (the shape field of the balloon image type table). Therefore, the area on the game screen corresponding to the balloon image "n" is acquired on the basis of the display position field and the image type ID field of the balloon image table.

When it is judged that at least a part of the area on the game screen corresponding to the balloon image "n" and at least a part of the area on the game screen corresponding to the one or more other balloon images overlap each other, it is judged whether depth degrees of all of the one or more other balloon images are larger than a depth degree of the balloon image "n" (S303). In other words, it is judged whether the balloon image "n" is displayed in front of the one or more other balloon images.

When it is judged in S302 that at least a part of the area on the game screen corresponding to the balloon image "n" and at least a part of the area on the game screen corresponding to the one or more other balloon images does not overlap each other, or when it is judged in S303 that the depth degrees of all the other balloon images are larger than a depth degree of the balloon image "n", the remaining-time-information updating unit 80 decrements a value of the remaining time field corresponding to the balloon image "n" in the balloon image table (S304). The display control unit 76 judges whether a value of the remaining time field is 0 (S305). When it is judged that the value of the remaining time field is 0, the display unit 76 deletes a record corresponding to the balloon image "n" in the balloon image table (S306). In this case, the balloon image "n" is not displayed on the game screen.

On the other hand, when it is judged in S303 that a depth degree of any one of the one or more other balloon images is smaller than the depth degree of the balloon image "n", i.e., it is judged that at least one of the one or more other balloon images is displayed in front of the balloon image "n", the value of the remaining time field corresponding to the balloon image "n" is not decremented in the balloon image table.

In this way, in the game device 10, only 1) when at least a part of the area on the game screen corresponding to the balloon image "n" and at least a part of the area on the game screen corresponding to one or more other balloon images do not overlap each other, or 2) when at least a part of the area on the game screen corresponding to the balloon image "n" and at least a part of the area on the game screen corresponding to one or more other balloon images overlap each other and the balloon image "n" is displayed in front of the one or more other balloon images, a display remaining time of the balloon image "n" is decreased. As a result, the balloon images disappear from the one which is displayed in its entirety on the game screen.

When the processing in S302 to S306 is executed with the balloon image "n" as an object, a value of the variable n is incremented (S307). It is judged whether the balloon image "n" is present (S308). When it is judged that the balloon image "n" is present, the processing in S302 to S306 is executed with the balloon image "n" as an object. On the other hand, when it is judged that the balloon image "n" is not present, the processing for updating the balloon image table is finished.

After executing the processing for initializing the balloon image table or the processing for updating the balloon image table (S103), the display control unit 76 judges whether determination operation has been performed (S104). This judgment is performed on the basis of an operation signal inputted from the controller 32. For example, it is judged whether an operation signal indicating that the button 38A is depressed and an operation signal indicating that the depression is released are inputted from the controller 32.

When it is judged that the determination operation has not been performed, the display control unit 76 creates a game screen as follows (S105). First, a field-of-view image is created. More specifically, a field-of-view image obtained by viewing a "virtual three-dimensional space in which player unit objects and enemy unit objects are arranged on the basis of content (the current position field) of the unit table" from a given viewpoint is created.

An image for synthesis is created. Specifically, an image for synthesis that has the same size as the field-of-view image and is transparent over the entire surface thereof is created.

After that, the movable range guide image 58 is added to the image for synthesis. The movable range guide image 58 is rendered to indicate a movable range of the movement instruction object player unit on the basis of a current position and a moving ability parameter of the movement instruction object player unit. The cursor image 60 is added to the image for synthesis. A rendering position of the cursor image 60 is determined on the basis of the moving destination position candidate information held by the display control unit 76. The marker image 56 is added to the image for synthesis. A rendering position of the marker image 56 is determined on the basis of the current position of the movement instruction object player unit.

Further, balloon images are added to the image for synthesis on the basis of the balloon image table. Each of the balloon images is an image in which a message character string specified by the balloon image type ID field (the message character string field of the balloon image type table) is included in a balloon of a shape specified by the field (the shape field of the balloon image type table). Rendering positions of the respective balloon images are specified by the display position field of the balloon image table. In this case, the balloon images are added to the image for synthesis in order from one having a large value of the depth degree field.

The display control unit 76 creates, in the VRAM, an image obtained by synthesizing the field-of-view image and the image for synthesis. The image created in the VRAM is displayed on the display unit 82 as a game screen at predetermined timing.

When it is judged that the determination operation has been performed (S104), the display control unit 76 updates a position of the movement instruction object player unit (S106). More specifically, a position indicated by the moving destination position candidate information held by the display control unit 76 is stored in the current position field of the movement instruction object player unit of the unit table.

After that, the display control unit 76 creates a game screen in the VRAM (S107). Specifically, a field-of-view image obtained by viewing a "virtual three-dimensional space in which player unit objects and enemy unit objects are arranged on the basis of content (the current position field) of the unit table" from a given viewpoint is created. An image for synthesis that has the same size as the field-of-view image and is transparent over the entire surface thereof is created. The marker image 56 and the cursor image 60 are added to the image for synthesis. An image obtained by synthesizing the field-of-view image and the image for synthesis is created in the VRAM. The image created in the VRAM is displayed on the display unit 82 as a game screen at predetermined timing.

The processing explained above is realized as a game program read out from the DVD-ROM 25 and executed by the microprocessor 14.

As explained above, according to the game device 10, since the balloon images disappear in order from one displayed in the front of the game screen, even when the balloon images are displayed to overlap one another, the player can suitably grasp contents of the respective balloon images.

When at least a part of an area on the game screen corresponding to a balloon image (a first balloon image) overlaps at least a part of another balloon image (a second balloon image), a depth degree of the first balloon image may be corrected on the basis of a degree of importance of the first balloon image and a degree of importance of the second balloon image. A degree of importance of a balloon image is determined on the basis of content of description of the balloon image. For example, a degree of importance of a balloon image including content that is important in terms of a story of a game is set high. For example, a degree of importance of a balloon image indicating that a player unit is likely to be attacked by an enemy unit in the next enemy's turn is set high.

Figure 16:
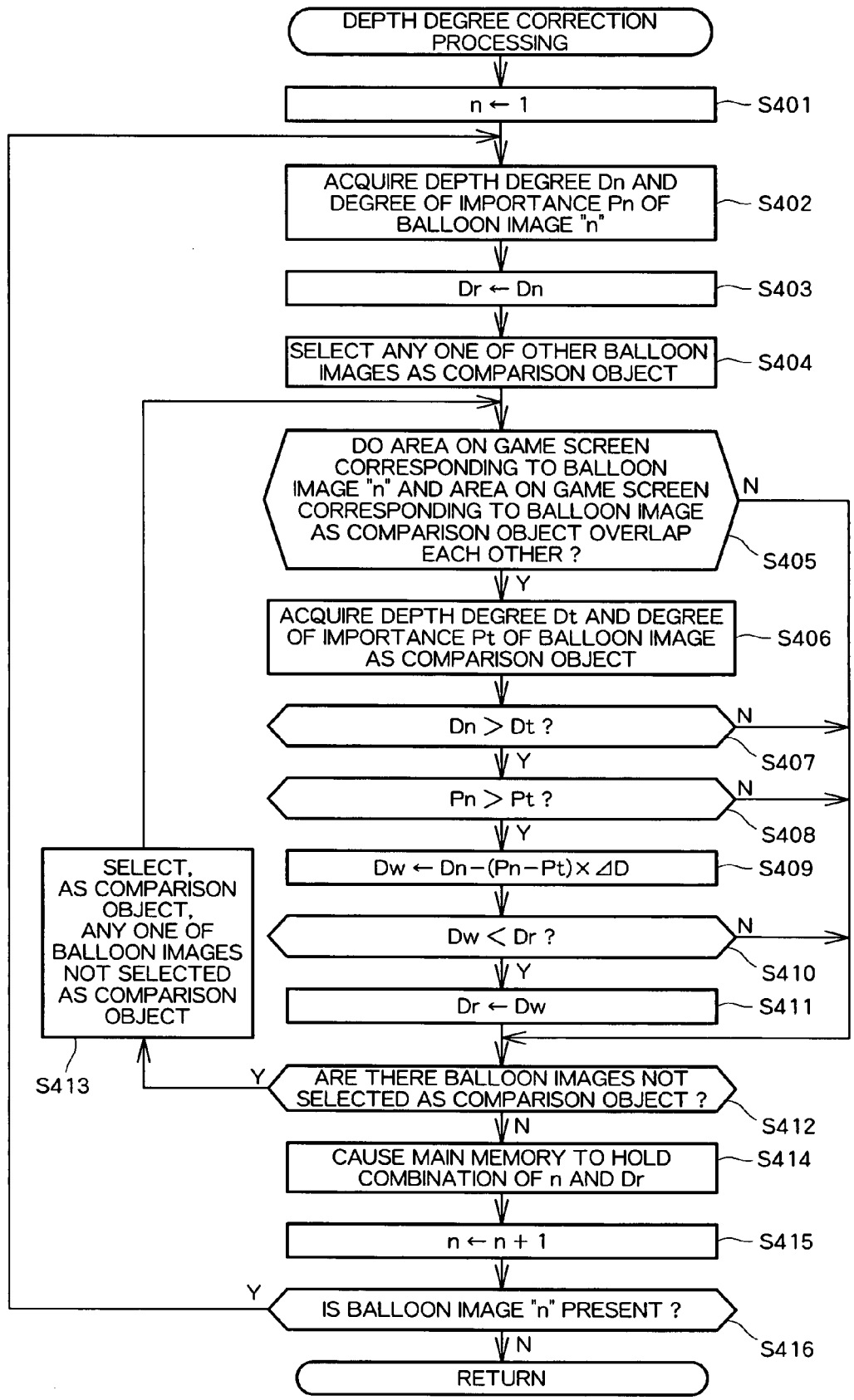
FIG. 16 is a flowchart showing processing executed in the game device.

FIG. 16 is a flowchart showing depth degree correction processing for correcting depth degrees of respective balloon images. This depth degree correction processing may be executed when it is judged in S215 in FIG. 14 that the variable n is larger than Nmax or may be executed before the processing for updating the balloon image table is executed after it is judged in S101 that the direction indicating operation has not been performed.

As shown in FIG. 16, in the depth degree correction processing, first, the variable n is initialized to 1 (S401). Subsequently, a depth degree Dn and a degree of importance Pn of the balloon image "n" is acquired (S402). The depth degree Dn is a numerical value stored in the depth degree field of a record corresponding to the balloon image "n" in the balloon image table. Similarly, the degree of importance Pn is a numerical value stored in the degree of importance field of a record corresponding to the balloon image "n" in the balloon image table. A value of Dn is substituted for a correction depth degree Dr (S403).

Subsequently, any one of the balloon images other than the balloon image "n" is selected as a comparison object (S404). It is judged whether at least a part of an area on the game screen corresponding to the balloon image "n" and at least a part of an area on the game screen corresponding to the balloon image as the comparison object overlap each other (S405). This judgment is performed in the same manner as the processing in S302.

When it is judged that at least a part of the area on the game screen corresponding to the balloon image "n" and at least a part of the area on the game screen corresponding to the balloon image as the comparison object overlap each other, a depth degree Dt and a degree of importance Pt of the balloon image as the comparison object are acquired (S406). The acquisition of the depth degree Dt and the degree of importance Pt is performed in the same manner as the processing in S402.

It is judged whether Dn is larger than Dt (S407). In other words, it is judged whether the balloon image as the comparison object is displayed in front of the balloon image "n". When it is judged that Dn is larger than Dt, it is further judged whether Pn is larger than Pt (S408). In other words, it is judged whether the balloon image "n" is more important than the balloon image as the comparison object.

When it is judged that Pn is larger than Pt, a corrected depth degree candidate Dw is calculated (S409). Dw is calculated in accordance with an expression Dw=Dn−(Pn−Pt)×ΔD. Here, ΔD is a predetermined constant. It is judged whether Dw is smaller than Dr (S410). When it is judged that Dw is smaller than Dr, a value of Dw is substituted for Dr (S411).

After that, it is judged whether balloon images that are balloon image other than the balloon image "n" and are not selected as a comparison object yet are present (S412). When it is judged that such balloon images are present, any one of the balloon images is selected as a comparison object (S413). In this case, the processing in S405 to S411 is executed with the newly selected balloon image as a comparison object. On the other hand, when it is judged that balloon images that are balloon image other than the balloon image "n" and are not selected as a comparison object yet are not present, a combination of values of n and Dr is held in the main memory 26 (S414).

When the processing in S402 to S414 is executed on the balloon image "n", the variable n is incremented (S415) and it is judged whether the balloon image "n" is present (S416).

When it is judged that the balloon image "n" is present, the processing in S402 to S415 is executed with the balloon image "n" as an object. On the other hand, when it is judged that the balloon image "n" is not present, the depth degree correction processing is finished.

The processing explained above is also realized as the game program read out from the DVD-ROM 25 is executed by the microprocessor 14.

When the depth degree correction processing is executed, a corrected depth degree (Dr) is calculated for each of the balloon images and held in the main memory 26. When 1) at least a part of the area on the game screen corresponding to the balloon image "n" and at least a part of the area on the game screen corresponding to the another balloon image overlap, 2) the other balloon image is displayed in front of the balloon image "n", and 3) a degree of importance of the other balloon image is lower than a degree of importance of the balloon image "n", the corrected depth degree corresponding to the balloon image "n" is a value obtained by subtracting an amount corresponding to a difference between the degree of importance of the balloon image "n" and the degree of importance of the other balloon image from an original depth degree. When a plurality of other balloon images satisfying the conditions are present, corrected depth degree candidates (Dw) are calculated with each of the plurality of other balloon images as objects and a minimum value of the corrected depth degree candidates is set as a corrected depth value. When no other balloon image satisfying the conditions is present, a corrected depth degree is the original depth degree.

The corrected depth degree calculated as described above and held in the main memory 26 only has to be used instead of a value of the depth degree field of the balloon image table in the processing for updating the balloon image table (FIG. 15) and the processing for generating a game screen (S105 in FIG. 13).

Consequently, when balloon images are displayed to overlap each other, it is possible to display a balloon image with a high degree of importance in front.

In the case where balloon images are displayed to overlap each other, when a balloon image with a high degree of importance is always displayed in front, the display may be unnatural if a difference of depth degrees of the balloon images is large. For example, when balloon images of a certain enemy unit (a first enemy unit) and an enemy unit (a second enemy unit) arranged in a position further apart from a viewpoint than the first enemy unit are displayed to overlap each other, if the balloon image corresponding to the second enemy unit is displayed in front of the balloon image corresponding to the first enemy unit because a degree of importance of the balloon image corresponding to the second enemy unit is higher than a degree of importance of the balloon image corresponding to the first enemy unit, the display of the balloon images may be unnatural depending on how far apart the second enemy unit is from the viewpoint.

In this regard, in the game device 10, a depth degree corresponds to each of balloon images and, when a balloon image with a lower degree of importance is displayed on a certain balloon image, a depth degree of a balloon image with a high degree of importance is reduced by an amount corresponding to a difference of degrees of importance. As a result, only when a depth degree of the balloon image with the high degree of importance is smaller than a depth degree of the balloon image with the low importance, the balloon image with the high degree of importance is displayed in front. Therefore, the balloon image with the high degree of importance is displayed in front while the unnatural display is prevented from occurring The invention is not limited to the embodiment described above.

For example, a message image is not limited to a balloon image.

For example, it is also possible to apply the present invention to a game device serving as a terminal of a network game system.

Further, for example, it is also possible to apply the invention to message image display devices other than a game device.

Figure 17:
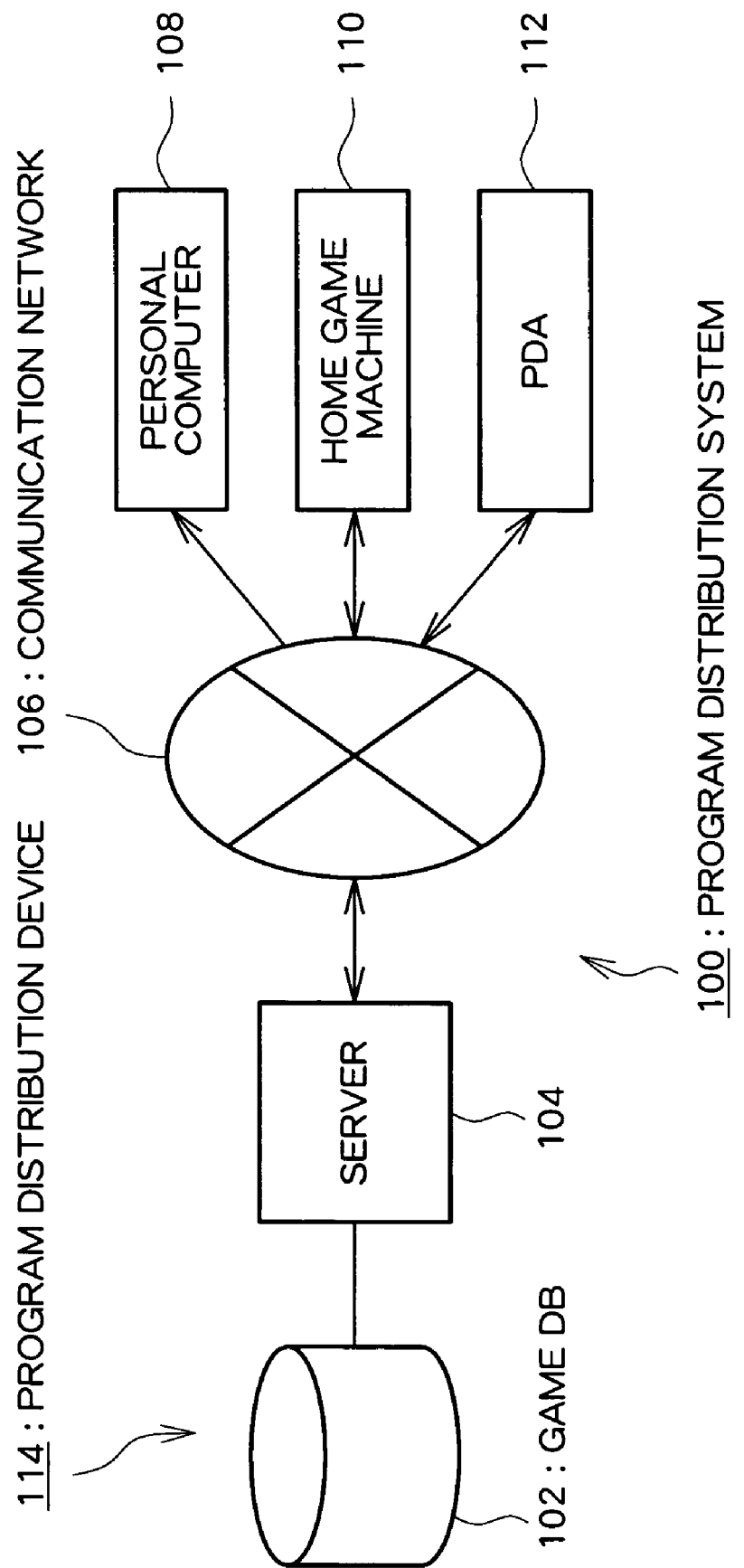
FIG. 17 is a diagram showing an overall structure of a program distribution system according to another embodiment of the present invention.

Still further, in the above description, the programs are supplied to the home game machine 11 from the DVD-ROM 25 serving as an information storage medium, and may also be distributed to homes and the like via a communication network. FIG. 17 is a diagram showing a whole structure of a program distribution system using the communication network. A program distribution method according to the present invention will be described with reference to the figure. As illustrated in the figure, a program distribution system 100 includes a game database 102, a server 104, a communication network 106, a personal computer 108, a home game machine 110, and a PDA (personal digital assistants) 112. A program distribution device 114 comprises the game database 102 and the server 104. The communication network 106 includes the Internet, a cable TV network, or the like. In this system, the game database (information storage medium) 102 stores programs identical to the content stored the DVD-ROM 25. Then, a consumer makes a game distribution request by use of the personal computer 108, the home game machine 110, the PDA 112, or the like, whereby the request is transferred to the server 104 via the communication network 106. Then, the server 104 reads the programs from the game database 102 in response to the game distribution request, and transmits the programs to the game distribution requester, such as the personal computer 108, the home game machine 110, the PDA 112, etc. Herein, the game is distributed in response to the game distribution request. However, the server 104 may transmit the game in a one-sided manner. Further, all components of the program necessary to realize a game are not necessarily sent at once (collective distribution), and only a necessary component of the program according to an aspect of the game may be sent (divided distribution). With a game distributed via a communication network 106 as described, a person in need of the program can readily obtain the program.

The invention claimed is:

1. A message image display device, comprising:
   display control means for causing display means to display a screen including a plurality of message images;
   remaining-time-information storing means for storing remaining time information corresponding to each of the plurality of message images;
   judging means for judging whether display of at least a part of the message image is limited by one or more other message images among the plurality of message images; and
   remaining-time-information updating means for updating the remaining time information according to a result of the judgment by the judging means,
   wherein the display control means limits display of each of the plurality of message images on the basis of the remaining time information stored corresponding to the message image.

2. A message image display device according to claim 1, wherein
   the remaining-time-information updating means updates, when it is judged that the display of the message image is not limited by one or more other message images among the plurality of message images, the remaining time information stored corresponding to the message image.

3. A message image display device according to claim 1, further comprising degree of importance storing means for storing a degree of importance corresponding to each of the plurality of message images, wherein the display control means limits, when at least a part of an area on the screen corresponding to a first message image among the plurality of message images and at least a part of an area on the screen corresponding to a second message image being another message image among the plurality of message images overlap each other, display of a portion of the first message image corresponding to at least the part of the area with the second message image, on the basis of a degree of importance stored corresponding to the first message image and a degree of importance stored corresponding to the second message image.

4. A message image display device according to claim 3, wherein the display control means includes depth-degree acquiring means for acquiring a depth degree of each of the plurality of message images, and limits, when at least a part of the area on the screen corresponding to the first message image and at least a part of the area on the screen corresponding to the second message image overlap each other, display of a portion of the first message image corresponding to at least the part of the area with the second message image, on the basis of a corrected depth degree obtained by increasing or decreasing a depth degree of the first message image acquired by the depth degree acquiring means by a degree corresponding to a difference between the degree of importance stored corresponding to the first message image and the degree of importance stored corresponding to the second message image.

5. A control method for a message image display device, comprising:

a display control step of causing display means to display a screen including a plurality of message images;

a judging step of judging whether display of at least a part of the message image is limited by one or more other message images among the plurality of message images; and a remaining-time-information updating step of updating, according to a result of the judgment by the judging step, remaining time information stored in remaining-time-information storing means for storing the remaining time information corresponding to each of the plurality of message images, wherein the display control step includes a step of limiting display of each of the plurality of message images on the basis of the remaining time information stored corresponding to the message image.

6. A computer-readable information storage medium storing a program for causing a computer to function as a message image display device, and also to function as:

display control means for causing display means to display a screen including a plurality of message images;

remaining-time-information storing means for storing remaining time information corresponding to each of the plurality of message images;

judging means for judging whether display of at least a part of the message image is limited by one or more other message images among the plurality of message images; and remaining-time-information updating means for updating the remaining time information according to a result of the judgment by the judging means, wherein the display control means limits the display of each of the plurality of message images on the basis of the remaining time information stored corresponding to the message image.

7. A message image display device according to claim 2, further comprising degree of importance storing means for storing a degree of importance corresponding to each of the plurality of message images, wherein the display control means limits, when at least a part of an area on the screen corresponding to a first message image among the plurality of message images and at least a part of an area on the screen corresponding to a second message image being another message image among the plurality of message images overlap each other, display of a portion of the first message image corresponding to at least the part of the area with the second message image, on the basis of a degree of importance stored corresponding to the first message image and a degree of importance stored corresponding to the second message image.

* * * * *